INVENTOR
CARL-GÖRAN NILSON 3,445,061
APPARATUS FOR INDICATING SLUDGE
LEVEL IN CENTRIFUGES
Carl-Göran Nilson, Tullinge, Sweden, assignor to Alfa-Laval AB, Tumba, Sweden, a corporation of Sweden
Filed Nov. 13, 1967, Ser. No. 682,221
Claims priority, application Sweden, Nov. 14, 1966, 15,514/66
Int. Cl. B04b 11/02
U.S. Cl. 233—20                    10 Claims

ABSTRACT OF THE DISCLOSURE

The centrifugal rotor has a channel leading from the sludge-collecting space at the peripheral part of the rotor to a chamber located in the central part of the rotor, and the chamber is provided with an inlet for supplying a fluid to the chamber. Two means are provided for sensing two different liquid levels, respectively, in the chamber; and the means for sensing the outer of the two levels may be arranged to operate a control for maintaining the liquid level in the chamber somewhere between the aforesaid two levels during the normal centrifugal separating operation. Thus, when sufficient sludge is accumulated to clog the outer end of the aforesaid channel, the liquid level in the chamber will increase until it is sensed by the means for sensing the inner of the two levels.

---

Figure 1:
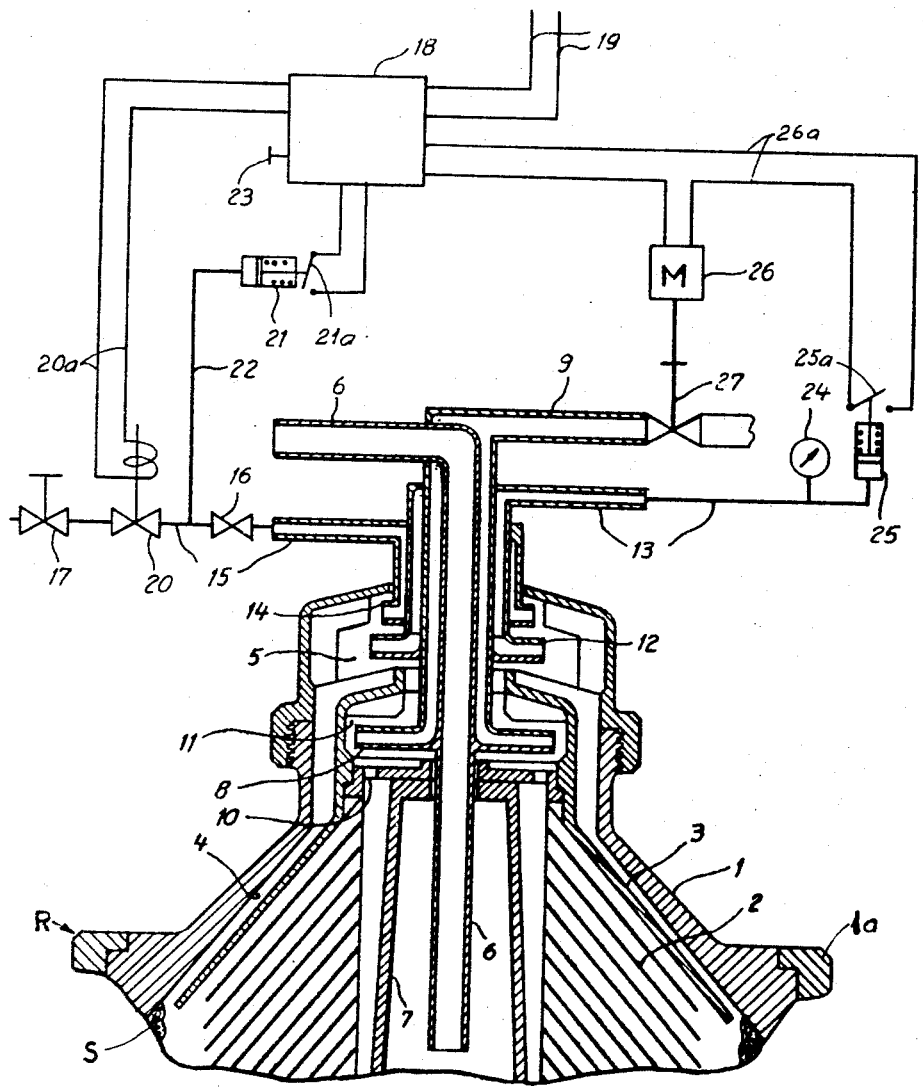

The present invention relates to an arrangement in sludge centrifuges for indicating the sludge level in the sludge space of the rotor. More particularly, the indicating arrangement is of the type comprising a channel which leads from the sludge space into a chamber situated in the center of the rotor and having a liquid inlet, and means for sensing a liquid level in this chamber.

Such an arrangement is disclosed in German patent specification No. 1,173,030. In this arrangement, the liquid level in the chamber can be situated anywhere outside the opening of the liquid inlet. When the distance between this opening and the liquid level is too large, the indicating principle utilized in the above-mentioned type of arrangement cannot be used, since the level displacement necessary for obtaining an indicating signal gives such a large pressure increase in the channel leading to the sludge space that a sludge cushion formed at the opening of the channel into the sludge space is flushed away.

According to the present invention, this problem is overcome by providing an additional means sensing another liquid level in the aforesaid chamber.

The new double arrangement of level sensing means makes it possible, during a separating operation and before a sludge discharge is to be effected, to locate the liquid level by means of the one level sensing means at such a distance from the axis of rotation that when sludge clogs the opening of said channel into the sludge space, only a small pressure increase in the channel is effected as a consequence of the liquid level in the chamber being displaced to the other level sensing means. Thus, accuracy of the sludge level indicating signal is ensured.

The level sensing means can be designed in different ways. For example, at least one such means can be an electric probe, in which case the level sensing can be effected by closing an electrical circuit if the liquid conducts electricity. Otherwise, the level sensing can take place in the chamber by means of a pipeline opening into the chamber, gas or liquid being supplied to the chamber through the pipeline. An increased pressure in the pipeline indicates that the liquid level in the chamber has reached the opening of the pipeline. Another form of level sensing means which may be used in carrying out the invention is one which is adapted to be actuated by the flow resistance offered by the rotating liquid mass in the chamber. Such a means can be a disc which offers resistance to turning, for example by means of a spring, and the periphery of which is wetted by the liquid level. It is also possible to use a paring means as the level sensing means. The paring means is pressure-generating by itself and thus can act upon a manometer or another signalling instrument, when the liquid level reaches its paring edge.

According to a preferred embodiment of the invention, one level sensing means comprises a paring means and the other level sensing means comprises an inlet pipeline opening into the chamber for supplying fluid thereto. In the channel of the paring means there may be inserted a diaphragm which closes this channel but is operable to transmit pressure variations to a signalling instrument, whereby sludge from liquid in the chamber is prevented from contacting the signalling instrument. In order to protect the signalling instrument which is inserted in the fluid inlet pipeline, there is inserted in this pipeline a non-return valve which closes the pipeline when liquid flows in the direction from the chamber. When starting a separating operation, the liquid level in the chamber is preferably adjusted so that it will be located between the two levels being sensed. This adjustment may be effected conveniently by means of an adjustable throttling valve inserted in an outlet for discharging separated liquid and connected to the rotor. The desired level can be adjusted by manual control of this valve, or the latter valve may be controlled automatically by one of the two level sensing means. In self-discharging sludge centrifuges, it is possible to effect the sludge discharges automatically under control of one of the level sensing means.

Figure 2:
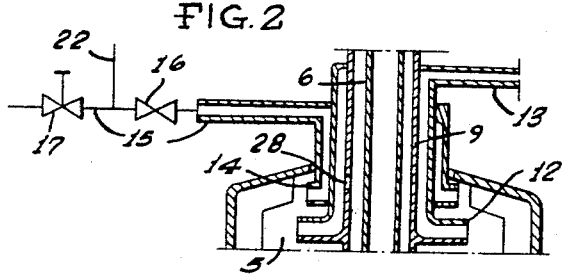

The invention is described more in detail below, reference being made to the accompanying drawings in which FIG. 1 is a vertical sectional view of the upper part of a centrifuge embodying one form of the invention, with associated controls shown schematically, and FIG. 2 is a similar fragmentary view of a modified embodiment.

Referring to FIG. 1, the centrifuge there shown comprises a centrifugal rotor R having a cover 1 secured by a member 1a to the main body or shell (not shown) of the rotor, the rotor being mounted for rotation about a central vertical axis. Within the hollow rotor is the usual conical disc set 2 and a conical top disc 3 which forms with the cover 1 a conical interspace 4. The latter constitutes an indicating channel leading inwardly from the slude-collecting space S of the rotor into a chamber 5 located centrally of the rotor in its upper part. A stationary inlet pipe 6 for the liquid to be separated opens into a distributor 7, from which the liquid passes in the usual manner to the separating chamber containing the discs 2. A stationary paring disc 8, concentric with the pipe 6, leads the separated liquid to a pipeline 9. Liquid separated in the disc set 2 flows through holes 10 into the paring chamber 11 containing the paring disc 8. In the chamber 5 there is located another stationary paring disc 12, the outlet of which is constituted by a pipeline 13 having its continuation symbolized by a simple line. Disc 12 is concentric with pipe 6. Above the paring disc 12 and also concentric with the pipe 6 is a stationary disc 14 with peripheral openings which communicate with a pipeline 15, which in its continuation is symbolized by a simple line. A non-return valve 16 is inserted in the pipeline 15 and prevents flow of liquid in the direction from the rotor R. In the same pipeline 15 there is inserted a valve 17, by means of which a flow of liquid to the chamber 5 can be adjusted.

The discharge of sludge from space S of the rotor is accomplished by lowering a piston valve (not shown) in the rotor, so as to uncover the usual peripheral outlets for the sludge; and when the desired discharge has been attained, the piston valve is raised to close the sludge outlets, whereupon the separating operation is resumed to accumulate another collection of separated sludge in space S. Such operation of the piston valve is conventional.

Control of this operation of the piston valve is effected by conventional devices in a control box 18, to which electric current is supplied by wires 19. The control box 18 controls the piston valve through a suitable operative connection, such as that disclosed at 27–28 in U.S. Patent No. 3,301,476 issued Jan. 31, 1967. A solenoid valve 20 in pipeline 15 is connected through wiring 20a to control box 18, which contains a suitable switch (not shown) for opening valve 20 periodically. A switch 21a connected to control box 18 is operated by a pressure-responsive device 21 to which the pressure in pipeline 15 is transmitted through a pipe 22. Closing of the pressure switch 21 starts a sludge discharge cycle, and such a cycle can also be started manually at any desired time by means of a push button 23. A manometer 24, inserted in the pipeline 13, indicates the pressure in the outlet of paring disc 12. The same pipeline 13 leads to a pressure-responsive device 25 for operating a switch 25a through which an electric motor 26 is adapted to be energized from control box 18, this motor serving to effect adjustment of a throttling valve 27 in pipeline 9. When switch 25a is closed, motor 26 is energized through its circuit 26a and turns valve 27.

In the operation of the arrangement shown in FIG. 1, the adjustable valve 17 is set to supply liquid to chamber 5 at a rate which is small in relation to the throughput rate of the centrifuge. This liquid can be, for example, liquid previously separated in the centrifuge and discharged through pipeline 9. The valve 20 is actuated from the control box 18 to admit the liquid intermittently through pipeline 15, so as to avoid flushing away the sludge cushion which will be formed at the opening of channel 4 into the sludge space S. It is assumed that a programming device in control box 18 has started supply of the liquid to be separated and which is supplied through pipeline 6. At the start, liquid pressure is absent in the pipeline 13, and for this reason the switch 25a is in its closed position and box 18 operates motor M to start throttling of valve 27. When liquid has filled the chamber 5 so much that the liquid level is located (reckoned radially) somewhat inside the edge of the paring disc 12, pressure is generated in the pipeline 13. When this pressure has reached a suitable value, the switch 25a opens so as to deenergize the motor 26, whereby valve 27 is stopped in a throttling position. The outlet of the separated liquid is thus throttled so that the liquid level in the chamber 5 has the desired radial position lying inside the openings of disc 12 but outside the openings of disc 14. Of course, the valve 27 can be adjusted by hand while utilizing the indications of the manometer 24.

The separating operation now proceeds until a liquid pulse, admitted through the pipeline 15 as previously described, generates a signal which indicates that the sludge level in the sludge space S has reached the opening of the channel 4. This signal is generated due to the fact that the liquid flow, which normally passes from the pipeline 15 through the chamber 5 and the channel 4 into the sludge space S, is throttled when the sludge cushion accumulates to the opening of channel 4. This throttling causes the liquid level in chamber 5 to increase radially inward past the periphery of the disc 14 and thereby generate a counter-pressure against the liquid flow through pipeline 15. The resulting increased pressure in the pipeline 15 is transmitted through pipe 22 and causes the pressure-responsive device 21 to close switch 21a, whereby the programming device in control box 18 starts a cycle of operations which automatically effect a sludge discharge. This cycle of operations comprises interruption of the supply of liquid to be separated. When the sludge is discharged, the different liquid levels in the centrifuge rotor are displaced radially outward. The pipeline 13 will then be without pressure, with the result that the switch 25a is closed to energize motor 26 and box 18 now operates the motor to turn the valve 27 to its unthrottled position. The sludge outlets are re-closed under control of the programming device in control box 18, which also causes resumption of the supply of liquid to be separated and throttling again of valve 27; and the previously described cycle of operations is repeated.

In the embodiment according to FIG. 2, the valve 20 is omitted and instead a stream of gas flows continuously through pipeline 15 into the chamber 5, at a rate determined by adjustment of valve 17. At the same time, liquid is supplied to the chamber 5 through a hole 28 provided in the wall of the discharge pipeline 9 for separated liquid, this hole opening into the paring disc 12. When a sludge cushion, formed at the opening of the channel 4, throttles the liquid flow into the sludge space S, the liquid level in the chamber 5 moves inward until it reaches the edge of the disc 14. The flow of gas from the disc 14 is then prevented by the fact that the liquid surface covers the edge of the disc. The gas pressure in the pipeline 15 and pipe 22 therefore rises until it closes the pressure switch 21a. Otherwise, this embodiment operates in the same manner as the embodiment according to FIG. 1.

I claim:

1. In combination with a sludge centrifuge including a centrifugal rotor mounted for rotation about an axis and having a peripheral sludge space for accumulating sludge separated in the rotor, an arrangement for determining when the sludge has accumulated in the sludge space to a predetermined radial level relative to said axis, said arrangement comprising means forming a chamber in the central part of the rotor and also forming a channel for flow of liquid radially outward from said chamber to the sludge space, said chamber having an inlet for supplying a liquid thereto, a first sensing means for sensing a first liquid level in said chamber, and a second sensing means for sensing movement of the liquid level in said chamber radially inward from said first level to a second level in response to accumulation of sludge at the outer end of said channel.

2. The combination according to claim 1, in which at least one of said sensing means includes a pipeline opening into said chamber for supplying a fluid thereto.

3. The combination according to claim 1, in which said second sensing means includes a pipeline opening into said chamber for supplying a fluid thereto.

4. The combination according to claim 1, in which at least one of said sensing means includes a paring device in said chamber.

5. The combination according to claim 1, in which said first sensing means includes a paring device in said chamber.

6. The combination according to claim 1, in which said first sensing means includes a paring device in said chamber, the second sensing means including an inlet pipeline for supplying said liquid to said chamber.

7. The combination according to claim 6, comprising also a non-return valve located in said inlet pipeline and operable to prevent flow of liquid therethrough in the direction from said chamber.

8. The combination according to claim 1, comprising also means forming a stationary outlet for liquid from which said sludge is separated in the rotor, and an adjustable throttling valve located in said stationary outlet.

9. The combination according to claim 1, comprising also means forming a stationary outlet for liquid from which said sludge is separated in the rotor, an adjustable throttling valve located in said stationary outlet, and an operative connection between said first sensing means and said valve for throttling said stationary outlet to position the liquid level in said chamber between said first and second levels during said sludge separation.

10. The combination according to claim 1, comprising also means under control of said second sensing means for effecting discharge of sludge from said sludge space.

References Cited

UNITED STATES PATENTS

| | | | |
|---|---|---|---|
| 3,167,509 | 1/1965 | Steinacker | 233—20 |
| 3,255,958 | 6/1966 | Simon | 233—20 |
| 3,301,476 | 1/1967 | Hemfort | 233—20 |

ROBERT W. JENKINS, *Primary Examiner.*